(12) United States Patent
Taylor (10) Patent No.: US 11,291,340 B2
(45) Date of Patent: Apr. 5, 2022

(54) PAINT BOOTH FILTER

(71) Applicant: Troy Taylor, Suquim, WA (US)

(72) Inventor: Troy Taylor, Suquim, WA (US)

(*) Notice: Subject to any disclaimer, the term of this patent is extended or adjusted under 35 U.S.C. 154(b) by 600 days.

(21) Appl. No.: 16/290,282

(22) Filed: Mar. 1, 2019

(65) Prior Publication Data

US 2020/0275813 A1 Sep. 3, 2020

(51) Int. Cl.
| | |
|---|---|
| *B01D 59/50* | (2006.01) |
| *A47L 9/16* | (2006.01) |
| *B01D 46/04* | (2006.01) |
| *A47L 9/14* | (2006.01) |
| *A47L 9/10* | (2006.01) |

(52) U.S. Cl.
CPC ............. *A47L 9/1683* (2013.01); *A47L 9/102* (2013.01); *A47L 9/1445* (2013.01); *B01D 46/04* (2013.01)

(58) Field of Classification Search
CPC ...... A47L 9/1683; A47L 9/102; A47L 9/1445; B01D 46/04; B01D 46/0024; B01D 46/12; B05B 14/43; Y10S 55/18; Y10S 55/46; F24F 3/163; Y02P 70/10; B08B 15/023
See application file for complete search history.

(56) References Cited

U.S. PATENT DOCUMENTS

| | | | | |
|---|---|---|---|---|
| 2,116,085 A | * | 5/1938 | Van Berkel | A47L 9/125 55/324 |
| 4,581,050 A | | 4/1986 | Krantz | |
| 4,726,825 A | * | 2/1988 | Natale | A47L 9/102 55/318 |
| 4,749,390 A | * | 6/1988 | Burnett | B01D 46/12 55/410 |
| 4,838,910 A | * | 6/1989 | Stollenwerk | B01D 46/00 55/385.2 |
| 4,959,144 A | * | 9/1990 | Bernard | B01D 29/96 210/232 |
| 4,961,764 A | * | 10/1990 | Develle | B60H 3/0658 96/139 |
| 5,108,474 A | * | 4/1992 | Riedy | B01D 39/16 55/485 |
| 5,259,854 A | * | 11/1993 | Newman | B01D 46/0024 251/65 |
| 5,350,432 A | | 9/1994 | Lee | |
| 5,762,664 A | * | 6/1998 | Vross | B01D 46/0024 126/343.5 A |
| 5,997,619 A | * | 12/1999 | Knuth | F24F 8/10 96/224 |
| 6,063,170 A | * | 5/2000 | Deibert | A61L 9/015 96/224 |
| 6,471,751 B1 | | 10/2002 | Semanderes et al. | |
| 6,833,016 B2 | | 12/2004 | Witter | |
| 7,282,074 B1 | | 10/2007 | Witter | |
| 8,099,828 B2 | | 1/2012 | Adelman et al. | |
| 8,163,051 B2 | | 4/2012 | Yun et al. | |
| 8,377,160 B2 | * | 2/2013 | Witter | B01D 46/0093 55/337 |

(Continued)

*Primary Examiner* — Dung H Bui
(74) *Attorney, Agent, or Firm* — Cramer Patent & Design, PLLC; Aaron R. Cramer (57) ABSTRACT

A paint booth filter assembly has a housing defining an interior having a securable lid, a shop vacuum exhaust attachment point, and a device exhaust. The device exhaust is secured within the lid. Secured within the interior of the housing is a plurality of removable air filters, having different levels of filtration.

20 Claims, 7 Drawing Sheets

(56) References Cited

U.S. PATENT DOCUMENTS

| | | | |
|---|---|---|---|
| 8,453,195 B2 | 6/2013 | Studebaker | |
| 8,580,022 B1 | 11/2013 | Gallardo | |
| 9,937,454 B2 | 4/2018 | Sedberry et al. | |
| 2001/0043891 A1* | 11/2001 | Adiletta | F01N 3/0217 422/177 |
| 2002/0166811 A1* | 11/2002 | Walker | B01D 46/0024 210/455 |
| 2005/0011356 A1* | 1/2005 | Laiti | B01D 46/0097 95/273 |
| 2006/0016163 A1* | 1/2006 | O'Connor | B01D 46/0023 55/481 |
| 2007/0000396 A1* | 1/2007 | Kieck | A47J 47/12 99/476 |
| 2007/0227362 A1* | 10/2007 | Parker | B01D 46/12 96/224 |
| 2008/0178418 A1* | 7/2008 | Conrad | A47L 9/1418 15/347 |
| 2012/0055125 A1* | 3/2012 | Manska | A47L 7/0071 55/394 |
| 2014/0305304 A1* | 10/2014 | Yokoi | B01D 50/00 96/1 |
| 2015/0052864 A1* | 2/2015 | Jackson | B01D 46/2411 55/486 |
| 2015/0113924 A1* | 4/2015 | Mathews | B01D 46/12 55/357 |
| 2015/0247278 A1* | 9/2015 | Gregory | D06F 58/22 34/480 |
| 2015/0273985 A1* | 10/2015 | Luley | B60H 3/0658 96/134 |
| 2015/0292755 A1* | 10/2015 | Pickett | B03C 3/28 96/74 |
| 2016/0258392 A1* | 9/2016 | Harris | F02M 35/0218 |
| 2018/0126597 A1* | 5/2018 | Rust | B29C 48/2567 |
| 2018/0195471 A1* | 7/2018 | Kimura | F02M 35/0203 |
| 2019/0298131 A1* | 10/2019 | Hu | A47L 9/1409 |

* cited by examiner

PAINT BOOTH FILTER

FIELD OF THE INVENTION

The present invention relates to a paint booth filter.

BACKGROUND OF THE INVENTION

There are a variety of work processes performed in factories, shops, repair centers, and even homes across the country that produce dust and fumes. These include painting, wood working, machining and the like. In most cases users' resort to exhaust fans, dust collection systems, or even simple shop vacuums to help control the dust, dirt, and fumes. In cases where filters are used to further control such contaminants, they are usually single stage affairs, which often produce less than satisfactory results. Such shortcomings usually fall along two (2) categories.

The first results from not capturing enough of the contaminants due to filter media which is not restrictive enough. The second category revolves around filter media which is restrictive or even overly restrictive and results in frequent clogging of the filter forcing time consuming cleaning or even costly replacement. Accordingly, there exists a need for a means by which filter systems used in dust and fume collection systems can produce high performance filtration without the necessity of frequent filter maintenance. The development of the portable multiple stage air filtration system 10 fulfills this need.

SUMMARY OF THE INVENTION

It is therefore an object of the present invention to provide a portable multiple stage air filtration system, comprising a generally cube-shaped enclosure having a box assembly along with a hinged lid. The hinged lid is affixed to the box assembly with a hinge and at least one clasp. The hinged lid is equipped with an exhaust port through which clean air exits the portable multiple stage air filtration system. The box assembly is provided with an intake port. The exhaust port is in fluid communication with an upper primary chamber. The intake port is in fluid communication with a lower secondary chamber. An area between the upper primary chamber and the lower secondary chamber is divided by a primary filter, a secondary filter, and a tertiary filter. The filters are supported on their own filter support grid. A gasket provided at a junction between the lower box assembly and the hinged lid is to prevent air leakage when the portable multiple stage air filtration system is under a vacuum condition. A plurality of casters attached to each bottom corner of the box assembly facilitate rolling the portable multiple stage air filtration system along a surface.

The exhaust port may include an inverted funnel shape that allows for ease of air flow. The exhaust port may also be provided with a friction fit flange for connection to a fixed ductwork, a flexible ductwork or one or more shop vacuum hoses for passage of the clean filtered air that exits the portable multiple stage air filtration system. The intake port may be connected to an intermediate hose, the vacuum source, and an input hose which receives dirty air.

The dirty air may include air from a paint booth, a machining station, a power tool, or other types of mechanical equipment that produces unwanted fines suspended in air. The portable multiple stage air filtration may also comprise an intermediate hose connects from the intake port on the portable multiple stage air filtration system to an output connection on the vacuum source. The vacuum source may produce a vacuum within the input hose and transfer the dirty air through the portable multiple stage air filtration system. The clean air may be exhausted from the portable multiple stage air filtration system through the exhaust port.

The vacuum source may be selected from the group consisting of a fixed ductwork, a flexible ductwork, a shop vacuum hoses, a dust collector, a fan, or a vacuum pump. The primary filter may filter and capture one or more contaminants in the dirty air. The secondary filter may capture a plurality of smaller particles that pass through the primary filter, and a tertiary filter may capture a plurality of smallest particles that pass through both the primary filter and the secondary filter. All the filters may be readily accessible when the hinged lid is opened along a hinged lid travel path to allow for rapid and frequent cleaning or changing of any of the filters. Each of the filter support grids may be supported on a support mechanism around a perimeter of the lower box assembly. The support mechanism may be selected from the group consisting of a flange, a clip, or a spring. A junction between each filter, its respective the filter support grid and the respective support mechanism may maintain pressure and prevent air leakage.

The gasket may be permanently affixed to the box assembly and completely encircles the tertiary filter. The tertiary filter could be of a denser material than either the primary filter or the secondary filter and capture the finest contaminants. The filter support grid may be provided with a plurality of perforations to allow for unimpeded air flow. The secondary filter may have a pleated design to allow for longer operating periods before replacement is necessary. The primary filter may be a course mesh.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 portable multiple stage air filtration system
15 enclosure
20 box assembly
25 lid
30 hinge
35 clasp
40 caster
45 exhaust port
50 friction fit flange
55 intake port
60 vacuum source
65 output hose
70 dirty air "d"
75 intermediate hose
80 output connection
85 clean air "c"
90 input hose
95 input connection
100 gasket
105 upper primary chamber
110 lower secondary chamber
125 primary filter
126 secondary filter
127 tertiary filter
130 lid travel path "l"
135 filter support grid
140 support mechanism
145 air travel path "a"
150 perforation

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
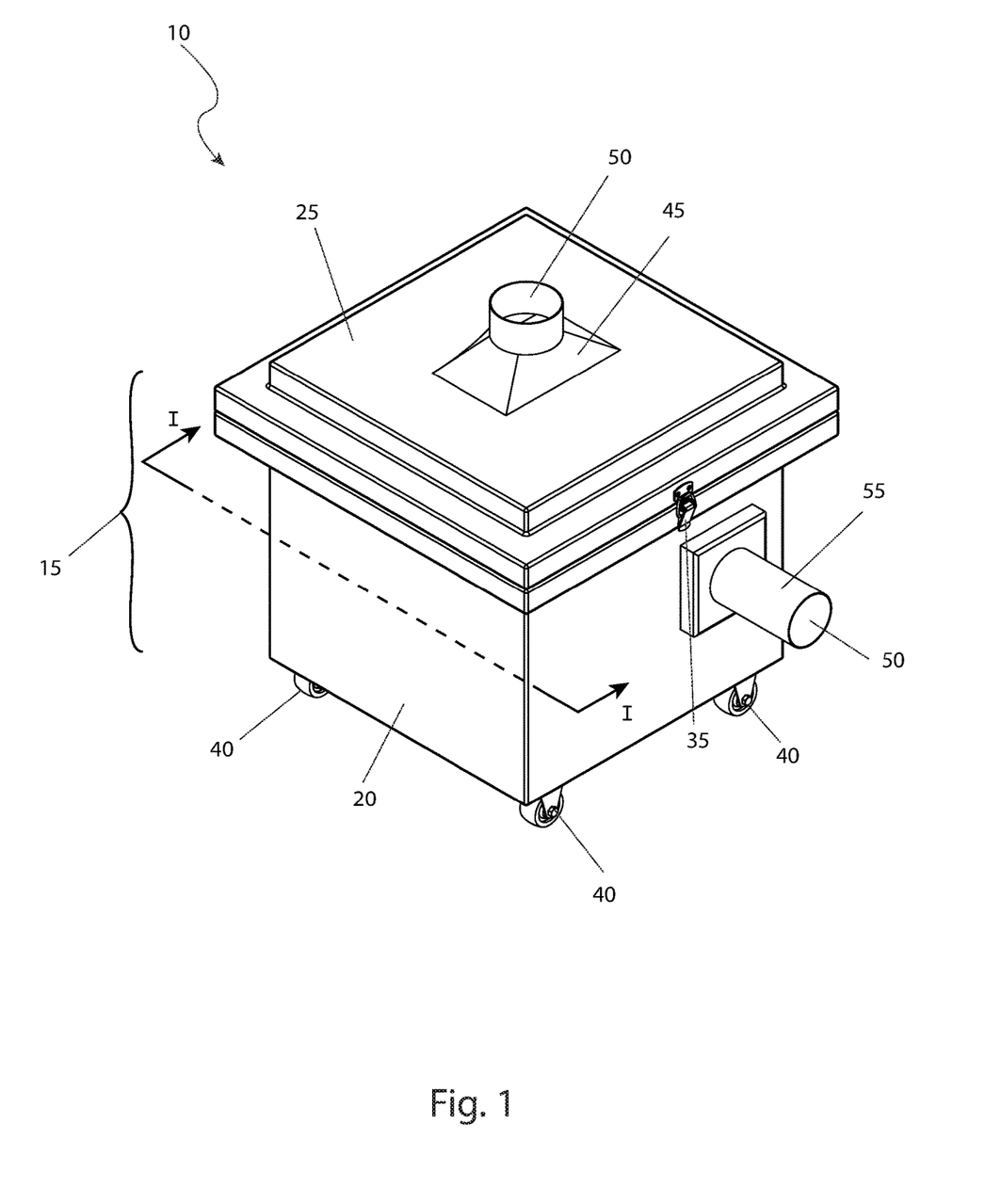
FIG. 1 is a perspective view of the portable multiple stage air filtration system 10, according to the preferred embodiment of the present invention.

Referring now to FIG. 1, a perspective view of the portable multiple stage air filtration system 10, according to the preferred embodiment of the present invention is disclosed. The portable multiple stage air filtration system 10 (herein also described as the "system") 10, includes a generally cube-shaped enclosure having a box assembly 20 along with a hinged lid 25. The lid 25 is affixed to the box assembly 20 with a hinge 30 (not shown due to illustrative limitations) and at least one (1) clasp 35. The system 10 may be equipped with four (4) casters 40 of which only three (3) are shown due to illustrative limitations. The lid 25 is equipped with an exhaust port 45 through which clean air "c" 85 exits the system 10. The exhaust port 45 comprises an inverted funnel shape that allows for ease of air flow and is provided with a friction fit flange 50 for connection to fixed or flexible ductwork, shop vacuum hoses or the like for the passage of clean filtered air "c" 85 that exits the system 10. Likewise, the face of the box assembly 20 is provided with an intake port 55. As with the exhaust port 45, the intake port 55 comprises a shape that allows for ease of air flow and is also provided with a friction fit flange 50 for connection to fixed or flexible ductwork, shop vacuum hoses or the like.

Figure 2:
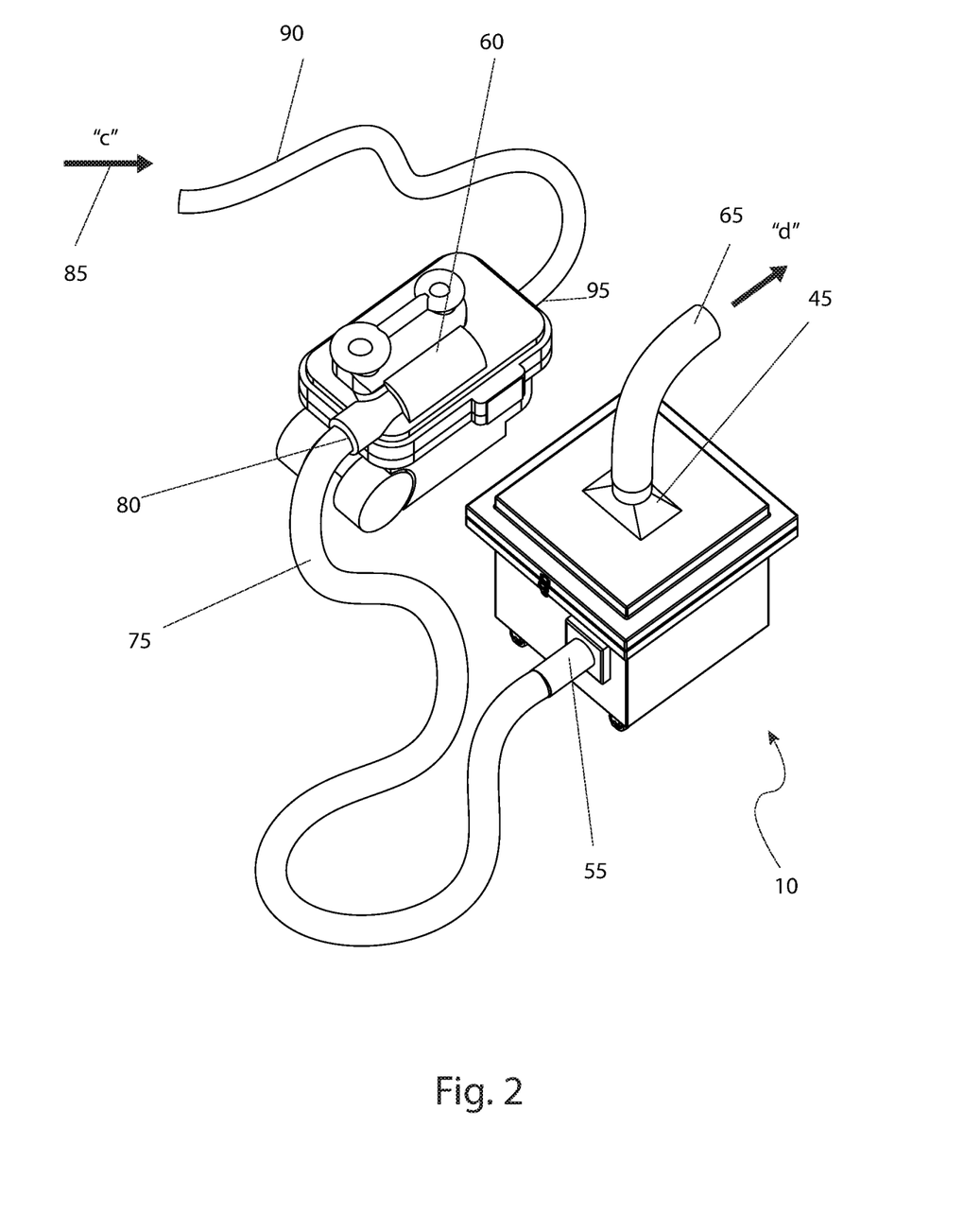
FIG. 2 is a pictorial flow diagram showing the portable multiple stage air filtration system 10 in a utilized state, according to the preferred embodiment of the present invention.

Referring next to FIG. 2, a pictorial flow diagram showing the system 10 in a utilized state, according to the preferred embodiment of the present invention is depicted. It is noted that the system 10 is being used with a vacuum source 60, here depicted as a shop vacuum. However, other types of vacuum source 60 including, but not limited to: a dust collector, a fan, or a vacuum pump may be used with equal effectiveness and as such, the use of any particular style of vacuum source 60 being utilized with the system 10 should not be interpreted as a limiting factor of the present invention. Additionally, it is noted that the system 10 is shown as being located downstream of the vacuum source 60, in effect filtering the air as it exits the vacuum source 60. However, the system 10 may also be utilized in an upstream position, in effect filtering the air before it enters the vacuum source 60. It is noted by those skilled in the art, that either position (upstream or downstream) will provide associated benefits depending on the application. As such, the positioning of the system 10 on either the output or the input of the vacuum source 60 should not be interpreted as a limiting factor of the present invention.

The intake port 55 of the system 10 is connected to an intermediate hose 75, vacuum source 60, and input hose 90 which receives dirty air "d" 70. The dirty air "d" 70 may comprise a wide variety of sources including, but not limited to: a paint booth, a machining station, a power tool, or other type of mechanical equipment that produces unwanted fines suspended in air. An intermediate hose 75 connects from the intake port 55 on the system 10 to an output connection 80 on the vacuum source 60. The input hose 90 is connected to an input connection 95 on the vacuum source 60. The vacuum source 60 acts in the expected manner to produce a vacuum within the input hose 90 and transfer the dirty air "d" 70 through the system 10. Clean air "c" 85 is exhausted from the device 10 through the exhaust port 45 Those skilled in the art will realize that the flow diagram depicted in FIG. 2 is one (1) of countless arrangements in which the system 10 may be utilized to clean and filter dirty air "d" 70.

Figure 3:
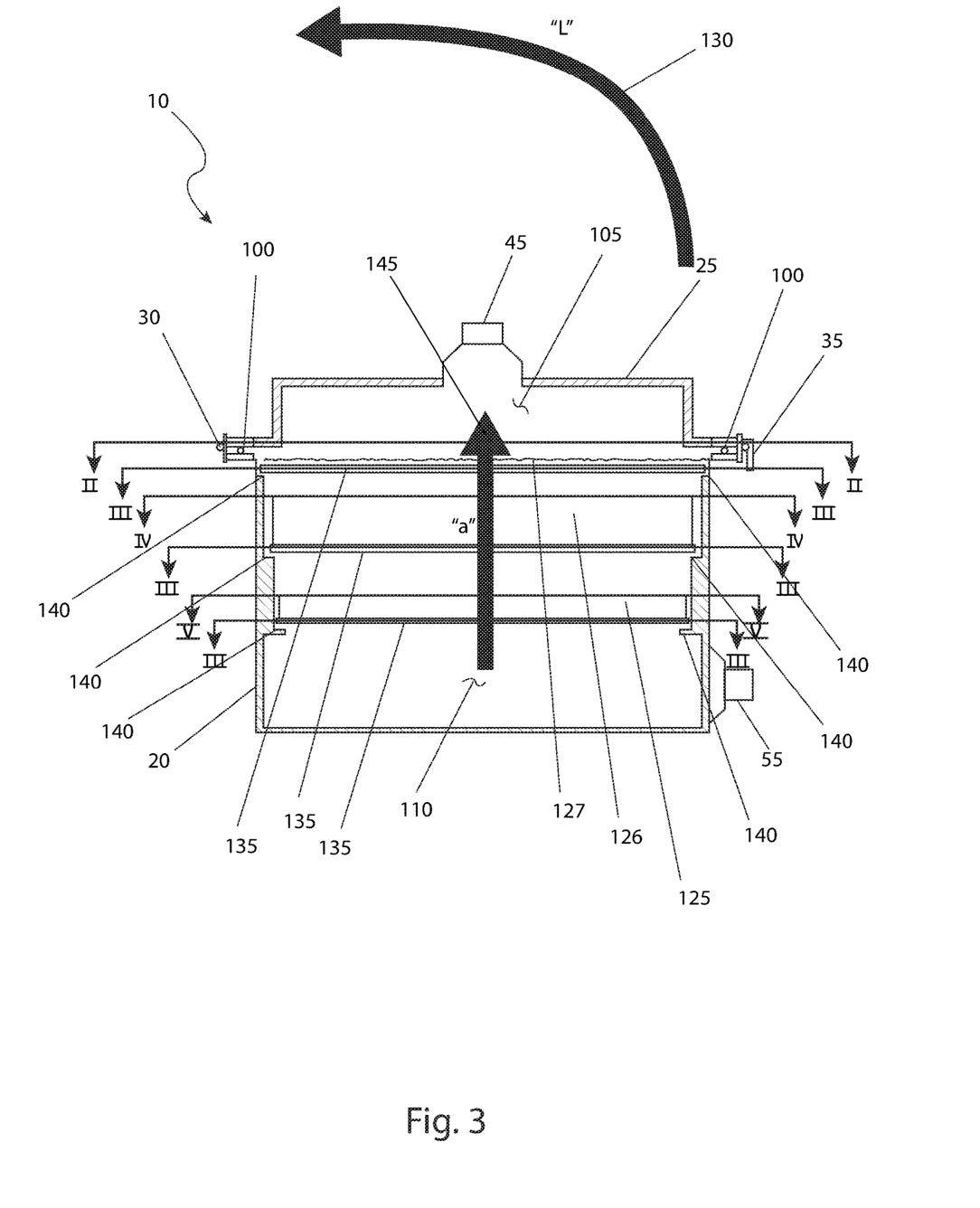
FIG. 3 is a sectional view of the portable multiple stage air filtration system 10, as seen along a line I-I, as shown in FIG. 1, according to the preferred embodiment of the present invention.

Referring now to FIG. 3, aa sectional view of the system 10, as seen along a line I-I, as shown in FIG. 1, according to the preferred embodiment of the present invention is shown. The lid 25 is connected to the box assembly 20 by the hinge 30 and the clasp 35 as aforementioned described. The casters 40 are omitted for purposes of clarity. A gasket 100 is provided at the junction between the lower box assembly 20 and the lid 25 to prevent air leakage when the system 10 is under a vacuum condition. The exhaust port 45 is in fluid communication with an upper primary chamber 105. Likewise, the intake port 55 is in fluid communication with a lower secondary chamber 110.

The area between the upper primary chamber 105 and the lower secondary chamber 110 is divided by a primary filter 125, a secondary filter 126, and a tertiary filter 127. The primary filter 125 performs the vast majority of the filtering and will capture the majority of the contaminants in the dirty air "d" 70 (as shown in FIG. 2). The secondary filter 126 captures smaller particles that pass through the primary filter 125, and the tertiary filter 127 captures the smallest particles that pass through both the primary filter 125 and the secondary filter 126. All of the filters 125, 126, 127 are readily accessible when the lid 25 is opened along a lid travel path "l" 130 to allows for rapid and frequent cleaning or changing of any of the filters 125, 126, 127. The primary filter 125, the secondary filter 126, and the tertiary filter 127 will be described in greater detail herein below. Each of the filters 125, 126, 127 are supported on their own filter support grid 135 (total of three (3)), all similar in design, but varying in outer size dimensions. Each of the filter support grids 135 is supported on a support mechanism 140, such as a flange, clip, spring, or the like around the perimeter of the lower box assembly 20. Due to the direction of air travel, as defined by an air travel path "a" 145 as the air progresses from dirty air "d" 70 (as shown in FIG. 2) to clean air "c" 85 (as shown in FIG. 2), the junction between each filter 125, 126, 127, its respective filter support grid 135 and the respective support mechanism 140, maintains pressure and prevents air leakage.

Figure 4:
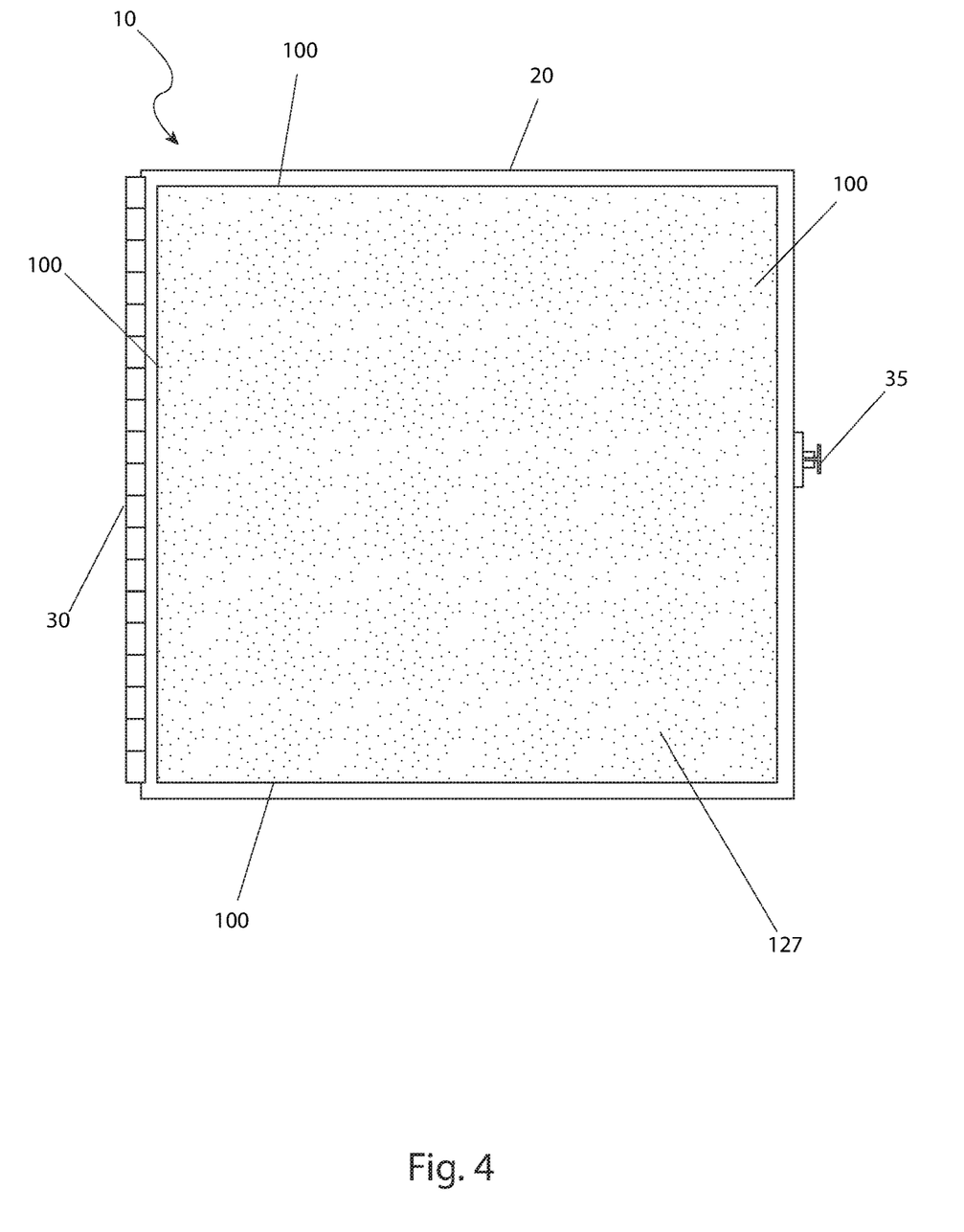
FIG. 4 is a sectional view of the portable multiple stage air filtration system 10, as seen along a line II-II, as shown in FIG. 3, according to the preferred embodiment of the present invention.
Figure 6:
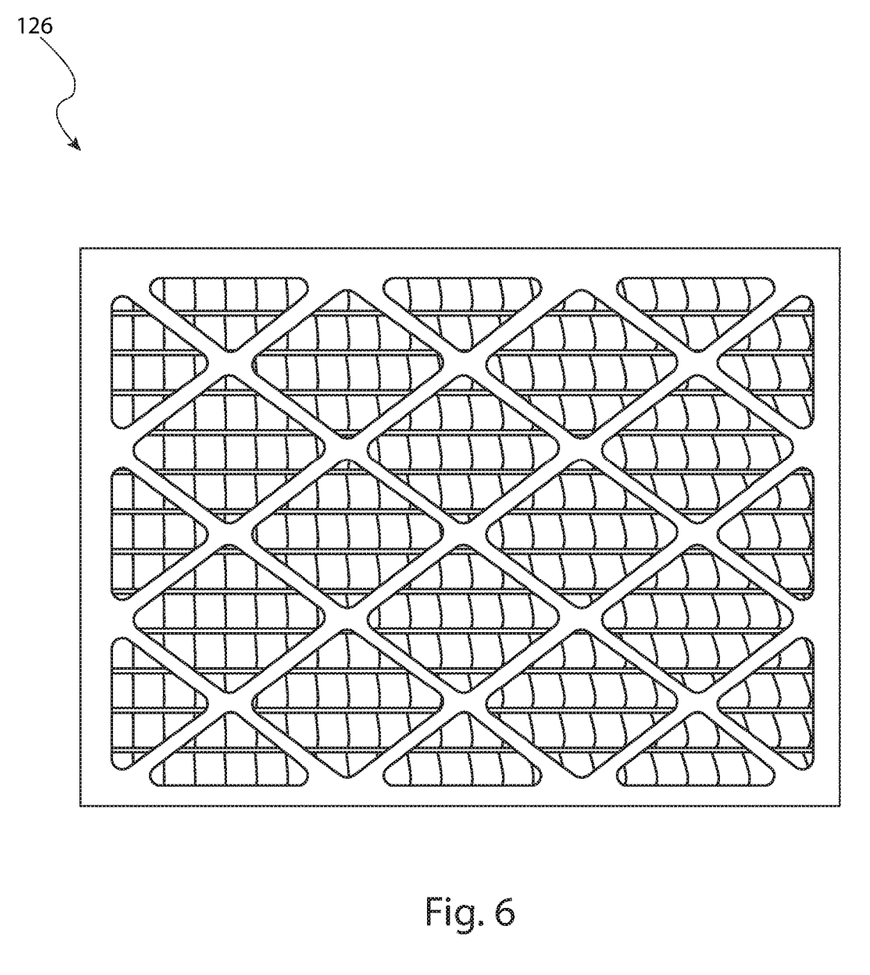
FIG. 6 is a sectional view of the portable multiple stage air filtration system 10, as seen along a line IV-IV, as shown in FIG. 3, according to the preferred embodiment of the present invention; and, FIG. 7 is a sectional view of the portable multiple stage air filtration system 10, as seen along a line V-V, as shown in FIG. 3, according to the preferred embodiment of the present invention.
Figure 7:
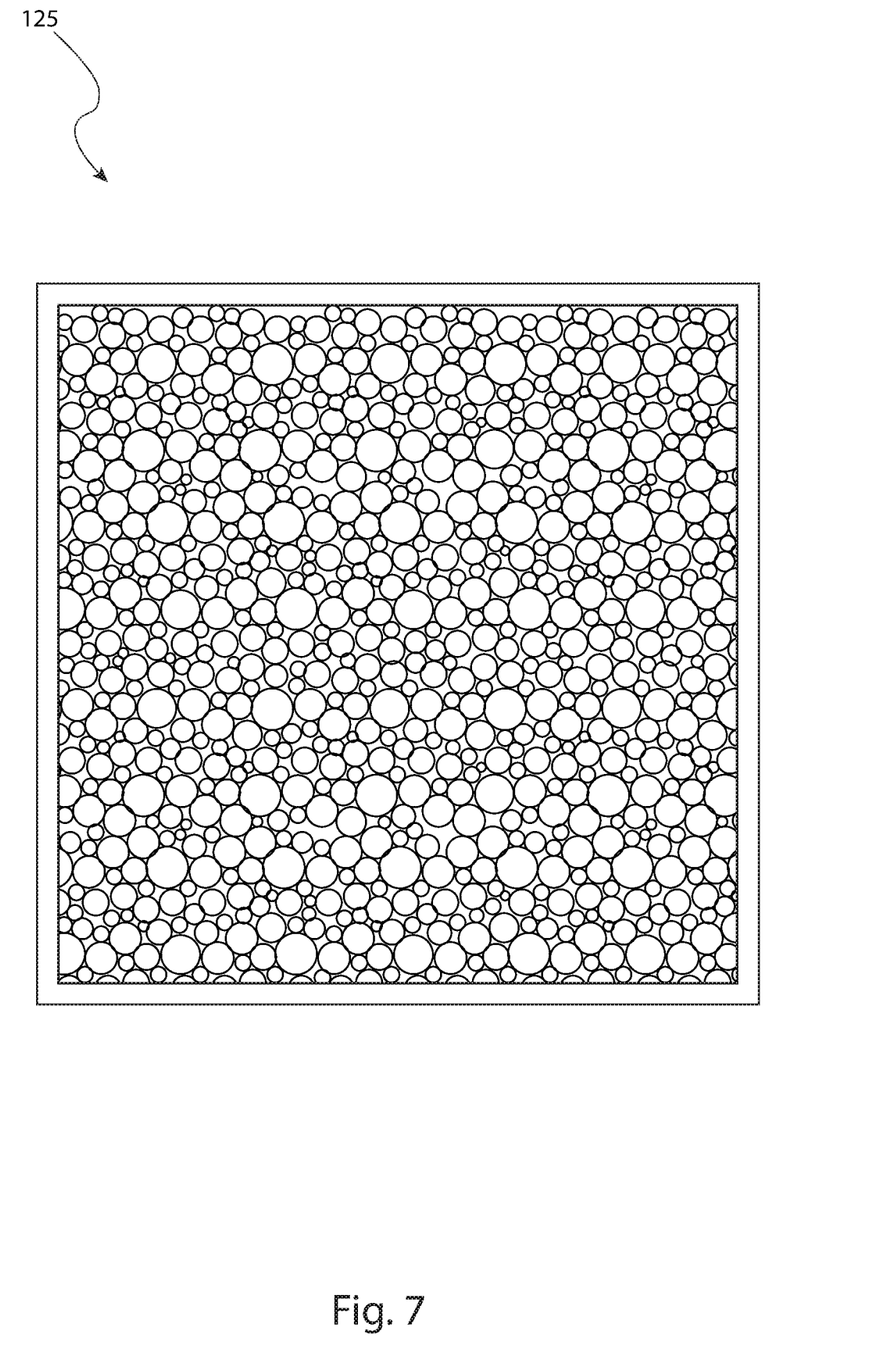

Referring next to FIG. 4, a sectional view of the system 10, as seen along a line II-II, as shown in FIG. 3, according to the preferred embodiment of the present invention is disclosed. The gasket 100 is permanently affixed to the box assembly 20 and completely encircles the tertiary filter 127. It is noted that the hinge 30 and the clasp 35 are likewise visible. It is envisioned that the tertiary filter 127 would be of a denser material than either the primary filter 125 (as shown in FIG. 7) or the secondary filter 126 (as shown in FIG. 6) and capture the finest of contaminants. Since larger size contaminants have already be removed or captured by the primary filter 125 (as shown in FIG. 7) and the secondary filter 126 (as shown in FIG. 6) the tertiary filter 127 may operate for considerable periods of time before replacement is necessary.

Figure 5:
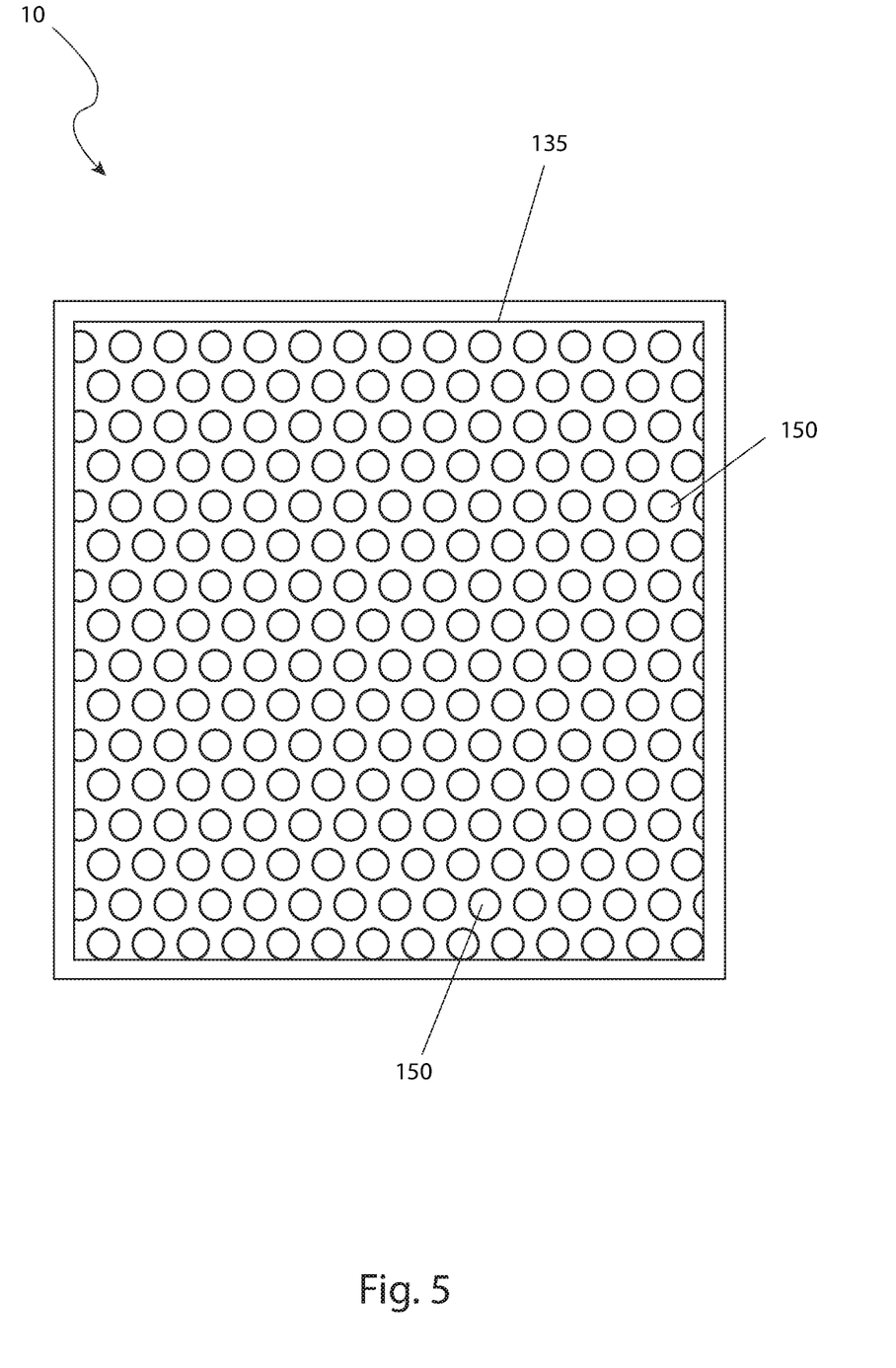
FIG. 5 is a sectional view of the portable multiple stage air filtration system 10, as seen along a line III-III, as shown in FIG. 3, according to the preferred embodiment of the present invention.

Referring now to FIG. 5, a sectional view of the system 10, as seen along a line III-III, as shown in FIG. 3, according to the preferred embodiment of the present invention is depicted. This view primarily discloses the filter support grid 135. As aforementioned described, the filter support grid 135 is repeated three (3) times and serves as a supporting structure for the primary filter 125 (as shown in FIG. 3), the secondary filter 126 (as shown in FIG. 3), and the tertiary filter 127 (as shown in FIG. 3). The filter support grid 135 is provided with multiple perforations 150 to allow for unimpeded air flow. It is envisioned that the filter support grid 135 would be manufactured from a durable material that provides structural rigidity such as plastic, steel, aluminum, stainless steel, or the like.

Referring next to FIG. 6, a sectional view of the system 10, as seen along a line IV-IV, as shown in FIG. 3, according to the preferred embodiment of the present invention is shown. This view primarily discloses the secondary filter 126. It is envisioned that the secondary filter 126 would be of a high-performance pleated design that captures a large amount of finer particles that pass through the primary filter 125. The pleated design will allow for longer operating periods before replacement is necessary.

Referring finally FIG. 7, a sectional view of the system 10, as seen along a line V-V, as shown in FIG. 3, according to the preferred embodiment of the present invention is disclosed. This view primarily discloses the primary filter 125. The primary filter 125 is envisioned as being a course mesh which captures large particles.

It is noted that the primary filter 125, the secondary filter 126 and the tertiary filter 127 are described for illustrative purposes only. Other types of filter including High efficiency particulate air (HEPA) filters, carbon filters, polyester filters, washable filters, electrostatic filters, and the like can be used with equal effectiveness with the system 10 depending on the exact circumstances of use. As such, the use of any particular style of filter at any of the three (3) positions (the primary filter 125, the secondary filter 126, and the tertiary filter 127) is not intended to be a limiting factor of the present invention.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 7. The user would procure the system 10 through conventional procurement channels. Particular attention would be paid to overall physical size of the system 10, desired airflow through the system 10 and types of filtration media to be used as the primary filter 125, the secondary filter 126, and the tertiary filter 127.

After procurement and prior to utilization, the system 10 would be prepared in the following manner: a filter support grid 135 and the primary filter 125 would be placed in the lowest position of the box assembly 20, a filter support grid 135 and a secondary filter 126 would be placed in the middle position of the box assembly 20, a tertiary filter 127 and a filter support grid 135 would be placed in the upper position of the box assembly 20 as shown in FIG. 3; the lid 25 is closed and secured with the hinge 30, an output hose 65 is connected to the exhaust port 45 and an intermediate hose 75 is connected to the intake port 55; and a suitable vacuum source 60 (either upstream or downstream) would be connected.

During utilization of the system 10, the following procedure would be initiated: the vacuum source 60 would be made operational; an air travel path "a" 145 is established in the system 10, and the dust/fume operation would commence. Various contaminants, dust, dirt, fumes, impurities, and the like would be captured by the primary filter 125, the secondary filter 126 and the tertiary filter 127.

After use of the system 10, it is cleaned in the following manner: the vacuum source 60 would be deactivated; wearing appropriate personal protective equipment (PPE) such as gloves, masks, eye protection, air filtration equipment or the like, the lid 25 is opened by releasing the clasp 35 and opening the lid 25 along the lid travel path "l" 130. Next, depending on the level of contamination, the primary filter 125 would be cleaned or replaced, the secondary filter 126 may be cleaned or replaced, and possible the tertiary filter 127 may be cleaned or replaced in the most extreme contamination conditions. Finally, the components of the system 10 would be reassembled in reverse order and operation would commence in a repeating manner as described above.

The usage of the system 10 provides for enhanced air filtration under a wide variety of situations. Benefits include but are not limited to easy cleaning and replacement of the filter media elements, cleaner air, and reduction of potentially harmful or irritating fumes or particles in ambient air.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable multiple stage air filtration system, comprising:
   a generally cube-shaped enclosure having a box assembly along with a hinged lid, said hinged lid is affixed to said box assembly with a hinge and at least one clasp, said hinged lid is equipped with an exhaust port through which clean air exits said portable multiple stage air filtration system, said box assembly is provided with an intake port, said exhaust port is in fluid communication with an upper primary chamber, said intake port is in fluid communication with a lower secondary chamber, an area between said upper primary chamber and said lower secondary chamber is divided by a primary filter, a secondary filter, and a tertiary filter, said filters are supported on their own filter support grid;
   a gasket provided at a junction between said lower box assembly and said hinged lid to prevent air leakage when said portable multiple stage air filtration system is under a vacuum condition; and
   a plurality of casters attached to each bottom corner of said box assembly to facilitate rolling said portable multiple stage air filtration system along a surface.

2. The portable multiple stage air filtration system according to claim 1, wherein said exhaust port includes an inverted funnel shape that allows for ease of air flow.

3. The portable multiple stage air filtration system according to claim 2, wherein said exhaust port is provided with a friction fit flange for connection to a fixed ductwork, a flexible ductwork or one or more shop vacuum hoses for passage of said clean filtered air that exits said portable multiple stage air filtration system.

4. The portable multiple stage air filtration system according to claim 1, wherein said intake port is connected to an intermediate hose, said vacuum source, and an input hose which receives dirty air.

5. The portable multiple stage air filtration system according to claim 4, wherein said dirty air includes air from a paint booth, a machining station, a power tool, or other types of mechanical equipment that produces unwanted fines suspended in air.

6. The portable multiple stage air filtration system according to claim 1, further comprising an intermediate hose connects from said intake port on said portable multiple stage air filtration system to an output connection on said vacuum source.

7. The portable multiple stage air filtration system according to claim 6, wherein said vacuum source produces a vacuum within said input hose and transfer said dirty air through said portable multiple stage air filtration system.

8. The portable multiple stage air filtration system according to claim 7, wherein said clean air is exhausted from said portable multiple stage air filtration system through said exhaust port.

9. The portable multiple stage air filtration system according to claim 1, wherein said vacuum source is selected from the group consisting of a fixed ductwork, a flexible ductwork, a shop vacuum hoses, a dust collector, a fan, or a vacuum pump.

10. The portable multiple stage air filtration system according to claim 1, wherein said primary filter filters and captures one or more contaminants in said dirty air.

11. The portable multiple stage air filtration system according to claim 10, wherein said secondary filter captures a plurality of smaller particles that pass through said primary filter, and a tertiary filter captures a plurality of smallest particles that pass through both said primary filter and said secondary filter.

12. The portable multiple stage air filtration system according to claim 1, wherein all said filters are readily accessible when said hinged lid is opened along a hinged lid travel path to allow for rapid and frequent cleaning or changing of any of said filters.

13. The portable multiple stage air filtration system according to claim 1, wherein each of said filter support grids are supported on a support mechanism around a perimeter of said lower box assembly.

14. The portable multiple stage air filtration system according to claim 13, wherein said support mechanism is selected from the group consisting of a flange, a clip, or a spring.

15. The portable multiple stage air filtration system according to claim 14, wherein a junction between each said filter, its respective said filter support grid and said respective support mechanism maintains pressure and prevents air leakage.

16. The portable multiple stage air filtration system according to claim 1, wherein said gasket is permanently affixed to said box assembly and completely encircles said tertiary filter.

17. The portable multiple stage air filtration system according to claim 1, wherein said tertiary filter would be of a denser material than either said primary filter or said secondary filter and capture said finest contaminants.

18. The portable multiple stage air filtration system according to claim 1, wherein said filter support grid is provided with a plurality of perforations to allow for unimpeded air flow.

19. The portable multiple stage air filtration system according to claim 1, wherein said secondary filter has a pleated design to allow for longer operating periods before replacement is necessary.

20. The portable multiple stage air filtration system according to claim 1, wherein said primary filter is a course mesh.

* * * * *